United States Patent
Ishimura

(10) Patent No.: US 10,180,817 B2
(45) Date of Patent: Jan. 15, 2019

(54) INFORMATION PROCESSING APPARATUS, TERMINAL APPARATUS, INFORMATION PROCESSING METHOD, NON-TRANSITORY COMPUTER READABLE MEDIUM, AND INFORMATION PROCESSING SYSTEM FOR CONTROLLING CONNECTION REQUESTS BETWEEN A TERMINAL APPARATUS AND AN IMFORMATION PROCESSING APPARATUS

(71) Applicant: FUJI XEROX CO., LTD., Tokyo (JP)

(72) Inventor: Takanari Ishimura, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 0 days.

(21) Appl. No.: 14/680,120

(22) Filed: Apr. 7, 2015

(65) Prior Publication Data
US 2016/0011824 A1    Jan. 14, 2016

(30) Foreign Application Priority Data
Jul. 10, 2014  (JP) ................. 2014-142683

(51) Int. Cl.
*G06F 3/12* (2006.01)
*H04W 76/19* (2018.01)
*H04W 76/34* (2018.01)

(52) U.S. Cl.
CPC .......... *G06F 3/1292* (2013.01); *G06F 3/1203* (2013.01); *G06F 3/1236* (2013.01); *H04W 76/19* (2018.02); *H04W 76/34* (2018.02)

(58) Field of Classification Search
CPC .......... H04N 1/00307; H04N 1/32784; H04N 1/32793; H04N 1/333; H04N 2201/0044;
(Continued)

(56) References Cited

U.S. PATENT DOCUMENTS 7,568,031 B2 *   7/2009  Tanimoto .............. G06F 3/1209
                                                  358/1.15
8,743,216 B2 *   6/2014  Yokota ................. H04N 1/0022
                                                  348/207.1
(Continued)

FOREIGN PATENT DOCUMENTS

| JP | 2011-201024 A | 10/2011 |
| JP | 2013187565 A | 9/2013 |
| JP | 2014107859 A | 6/2014 |

OTHER PUBLICATIONS

Communication dated Apr. 3, 2018, issued by the Japan Patent Office in corresponding Japanese Application No. 2014-142683.

*Primary Examiner* — Barbara Reinier
(74) *Attorney, Agent, or Firm* — Sughrue Mion, PLLC

(57) ABSTRACT

An information processing apparatus includes a first communication unit, a request accepting unit, a second communication unit, and a process performing unit. The first communication unit performs first communication to communicate with a terminal apparatus. The request accepting unit accepts a request for a data processing process from the terminal apparatus via the first communication. The second communication unit stores information concerning the requested data processing process in a memory upon the request accepting unit accepting the request, temporarily disconnects a connection between the information processing apparatus and the terminal apparatus, and performs second communication to communicate with the terminal apparatus in a case where a condition under which the requested data processing process is performed is satisfied. The process performing unit performs the requested data processing process via the second communication by using the information stored in the memory.

12 Claims, 12 Drawing Sheets

(58) Field of Classification Search
CPC ... H04N 2201/0015; H04N 2201/0027; H04N 2201/002; H04N 2201/0022; H04N 1/00217; H04N 1/214; H04N 1/3275; H04N 1/32756; G06F 3/1204; G06F 3/1292; G06F 3/1236; G06F 3/1214

See application file for complete search history.

(56) References Cited

U.S. PATENT DOCUMENTS

| | | | |
|---|---|---|---|
| 8,867,071 | B2 | 10/2014 | Ohara |
| 2013/0201525 | A1* | 8/2013 | Niwa ............... G06F 3/1236 358/1.15 |
| 2013/0260674 | A1* | 10/2013 | Shimada ............. H04W 76/02 455/39 |
| 2013/0260683 | A1* | 10/2013 | Suzuki ............... H04W 4/008 455/41.1 |
| 2014/0085666 | A1* | 3/2014 | Park ................. H04W 4/008 358/1.15 |
| 2014/0153017 | A1 | 6/2014 | Watanabe et al. |
| 2015/0156783 | A1* | 6/2015 | Klang ............... H04W 52/243 455/436 |
| 2015/0327172 | A1 | 11/2015 | Kusakabe |

\* cited by examiner

FIG. 6

| TABLE NO. | 1 |
|---|---|
| JOB ID | AA01 |
| MAC ADDRESS | BBBB |
| DEVICE NAME | MOBILE A |
| PMK | XXX |
| PASSPHRASE | YYY |

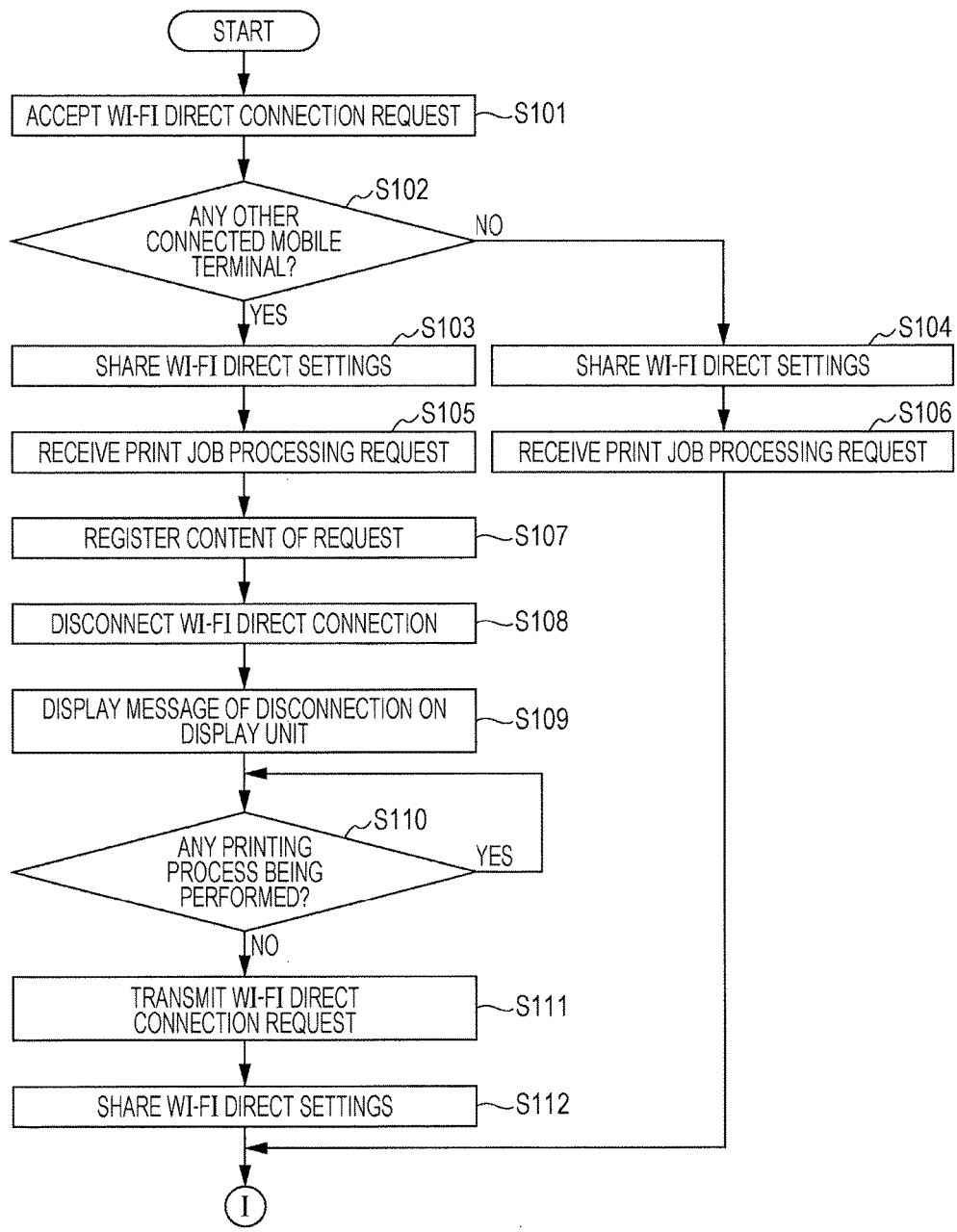

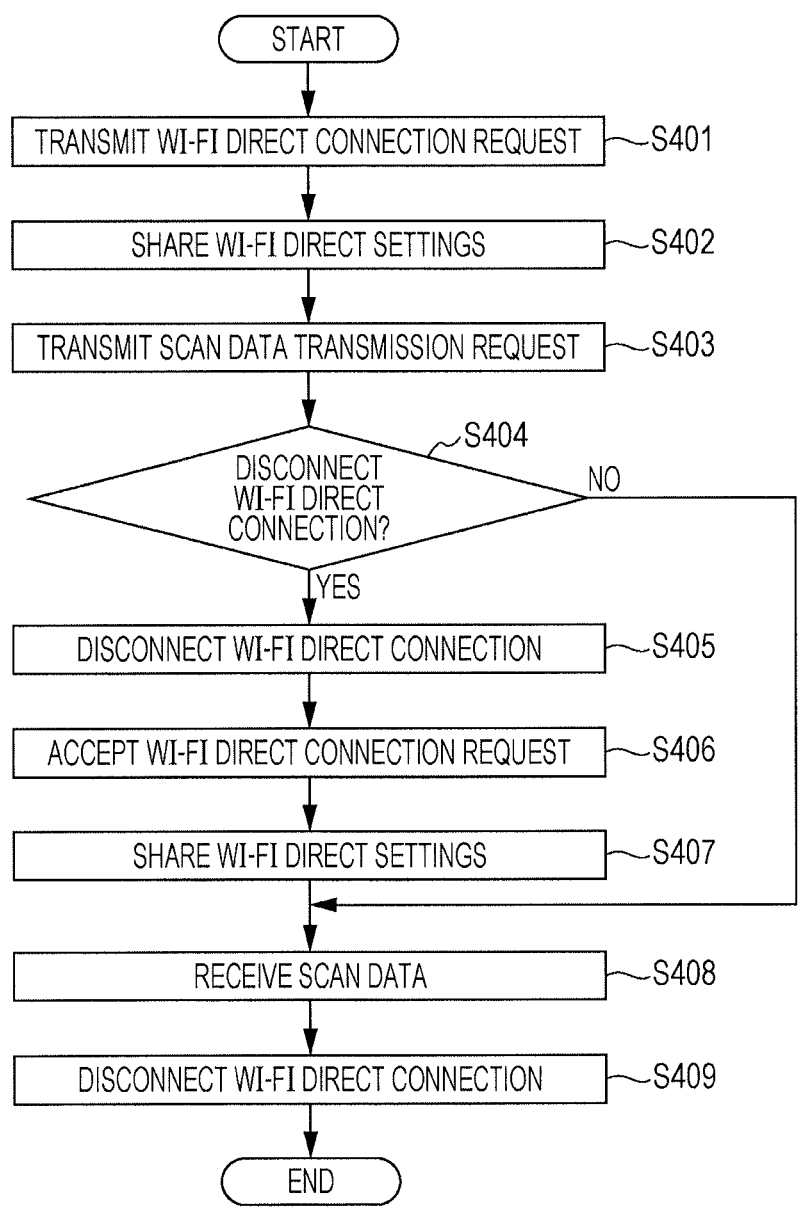

INFORMATION PROCESSING APPARATUS, TERMINAL APPARATUS, INFORMATION PROCESSING METHOD, NON-TRANSITORY COMPUTER READABLE MEDIUM, AND INFORMATION PROCESSING SYSTEM FOR CONTROLLING CONNECTION REQUESTS BETWEEN A TERMINAL APPARATUS AND AN IMFORMATION PROCESSING APPARATUS

CROSS-REFERENCE TO RELATED APPLICATIONS

This application is based on and claims priority under 35 USC 119 from Japanese Patent Application No. 2014-142683 filed Jul. 10, 2014.

BACKGROUND (i) Technical Field

The present invention relates to an information processing apparatus, a terminal apparatus, an information processing method, a non-transitory computer readable medium, and an information processing system.

(ii) Related Art

For example, there are cases where a user wishes to connect a terminal apparatus to an information processing apparatus by using wireless communication based on Wireless Fidelity (Wi-Fi) or the like.

SUMMARY

According to an aspect of the invention, there is provided an information processing apparatus including a first communication unit, a request accepting unit, a second communication unit, and a process performing unit. The first communication unit performs first communication to communicate with a terminal apparatus. The request accepting unit accepts a request for a data processing process from the terminal apparatus via the first communication. The second communication unit stores information concerning the requested data processing process in a memory upon the request accepting unit accepting the request, temporarily disconnects a connection between the information processing apparatus and the terminal apparatus, and performs second communication to communicate with the terminal apparatus in a case where a condition under which the requested data processing process is performed is satisfied. The process performing unit performs the requested data processing process via the second communication by using the information stored in the memory.

BRIEF DESCRIPTION OF THE DRAWINGS

Exemplary embodiments of the present invention will be described in detail based on the following figures, wherein:

FIG. 6 illustrates an example of a job information management table;

FIGS. 7A and 7B are flowcharts illustrating an example of a procedure of a process performed by the image processing apparatus to perform a printing process;

FIG. 10 is a flowchart illustrating an example of a procedure of a process performed by the mobile terminal to transmit a scan data transmission request and receive scan data.

DETAILED DESCRIPTION

Exemplary embodiments of the present invention will be described in detail below with reference to the accompanying drawings.

First Exemplary Embodiment

System Configuration

Figure 1:
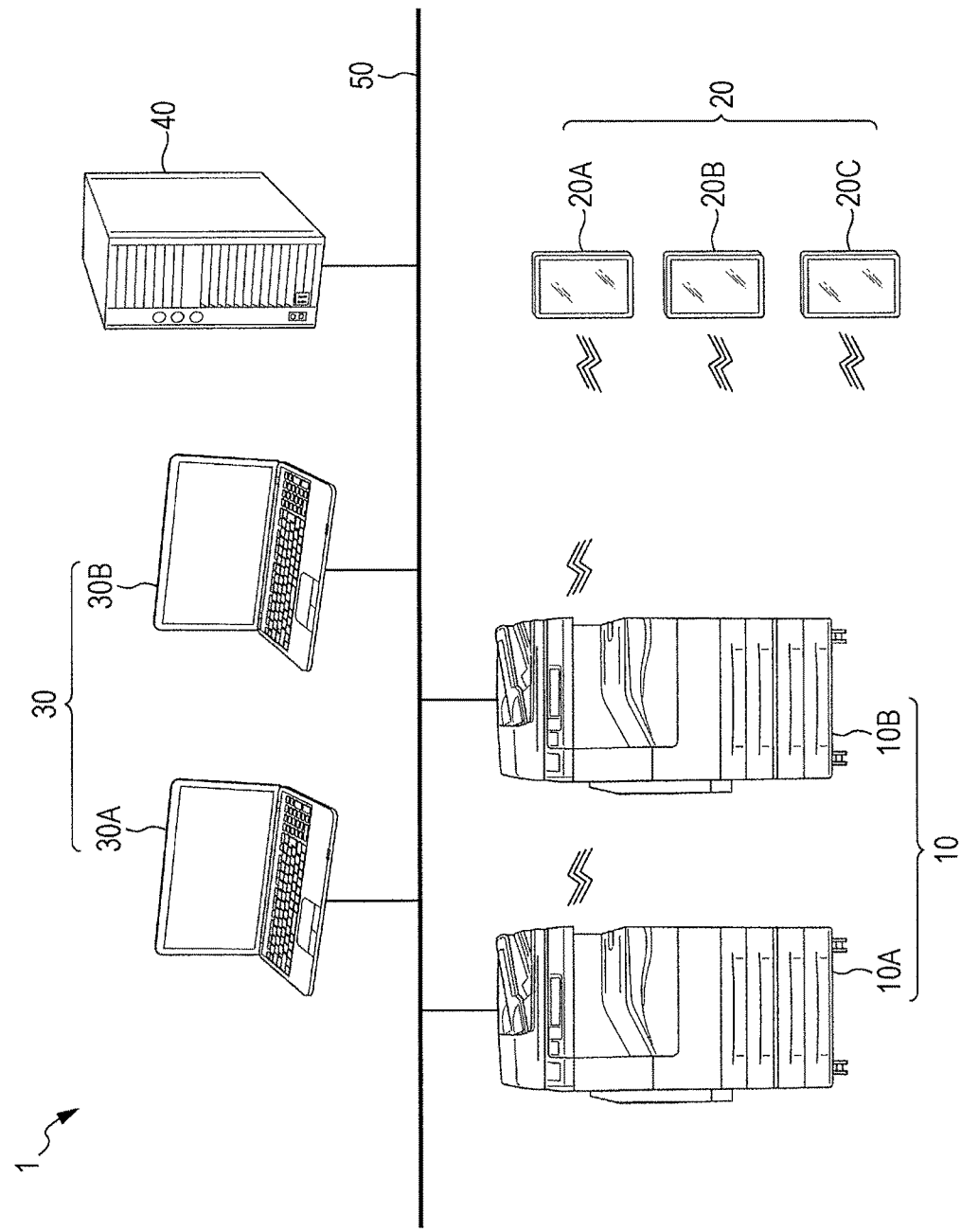
FIG. 1 illustrates an example of an overall configuration of an image processing system according to an exemplary embodiment.

An overall configuration of an image processing system 1 according to an exemplary embodiment will be described. FIG. 1 illustrates an example of an overall configuration of the image processing system 1 according to the present exemplary embodiment. As illustrated in FIG. 1, the image processing system 1 includes an image processing apparatus 10A, an image processing apparatus 10B, a mobile terminal 20A, a mobile terminal 20B, a mobile terminal 20C, an operation terminal 30A, an operation terminal 30B, and a management server 40. Wireless communication is performed among the image processing apparatus 10A, the image processing apparatus 10B, the mobile terminal 20A, the mobile terminal 20B, and the mobile terminal 20C. In addition, the image processing apparatus 10A, the image processing apparatus 10B, the operation terminal 30A, the operation terminal 30B, and the management server 40 are connected to a network 50 and communicate with one another via the network 50.

The image processing apparatuses 10A and 10B are illustrated in FIG. 1; however, the image processing apparatuses 10A and 10B are referred to as image processing apparatuses 10 if distinction between them is not required. Likewise, the mobile terminals 20A, 20B, and 20C are illustrated in FIG. 1; however, the mobile terminals 20A, 20B, and 20C are referred to as mobile terminals 20 if distinction between them is not required. Further, the operation terminals 30A and 30B are illustrated in FIG. 1; however, the operation terminals 30A and 30B are referred to as operation terminals 30 if distinction between them is not required. Two image processing apparatuses 10 are provided in the example illustrated in FIG. 1; however, three or more image processing apparatuses 10 may be provided. Further, three mobile terminals 20 are provided in the example illustrated in FIG. 1; however, four or more mobile terminals 20 may be provided. In addition, two operation terminals 30 are provided in the example illustrated in FIG. 1; however, three or more operation terminals 30 may be provided.

Each of the image processing apparatuses 10 is, for example, an apparatus having functions such as a scan function, a print function, a copy function, and a facsimile function, and forms an image on a recording medium such as paper and outputs the resulting recording medium. Each of the image processing apparatuses 10 receives a print job from the mobile terminals 20 and the operation terminals 30 and performs a printing process in accordance with the print job that has been received. A print job includes image data to be printed and a control instruction that describes settings used in the printing process, and is data that serves as a unit of a printing process performed by the image processing apparatus 10.

Each of the mobile terminals 20 is a mobile computer apparatus used when an instruction to execute various functions is given to the image processing apparatuses 10. For example, an apparatus such as a smartphone, a tablet personal computer (PC), or a notebook PC may be used as the mobile terminal 20.

Each of the operation terminals 30 is a computer apparatus used by a user to view and edit a document file. For example, an apparatus such as a notebook PC or a desktop PC may be used as the operation terminal 30. In addition, a mobile computer apparatus such as a smartphone may also be used as the operation terminal 30.

The management server 40 is a computer apparatus that stores various kinds of data processed by the image processing system 1.

The network 50 is a communication medium used for communication of information among apparatuses such as the image processing apparatuses 10, the operation terminals 30, and the management server 40. The network 50 is, for example, a wired local area network (LAN).

In the present exemplary embodiment, short-range wireless communication (e.g., near-field communication (NFC)) and wireless communication based on another communication standard (e.g., Wi-Fi Direct) that achieves a speed higher than that achieved with the short-range wireless communication are performed between the image processing apparatuses 10 and the mobile terminals 20. NFC is a wireless communication standard in which a communication range is limited to approximately ten centimeters. In addition, Wi-Fi Direct is a standard that enables direct communication between Wi-Fi terminals. According to Wi-Fi Direct, each Wi-Fi device has a function for operating as an access point. An access point is a relay device that wirelessly relays communication between devices. Specifically, according to Wi-Fi Direct, one of plural Wi-Fi devices that participate in a network substantially operates as an access point, and direct communication is performed between the device serving as the access point and the other Wi-Fi devices.

According to Wi-Fi Direct, each communication apparatus that participates in a certain network is defined as a peer-to-peer (P2P) device, and the network is defined as a P2P group. A P2P device that substantially operates as an access point in a P2P group is defined as a P2P group owner. P2P devices other than the P2P group owner are defined as P2P clients. Each P2P device exchanges a signal with another P2P device to detect a P2P device that serves as a Wi-Fi Direct connection destination candidate. In this way, the P2P group owner is selected from among plural P2P devices.

In the present exemplary embodiment, a description will be given on the assumption that the image processing apparatuses 10 serve as the P2P group owners. In addition, according to Wi-Fi Direct, the maximum number of P2P clients that are allowed to connect to the P2P group owner at one time is generally set. In the present exemplary embodiment, it is assumed that the maximum number for the number of mobile terminals 20 that are allowed to connect to each of the image processing apparatuses 10 using Wi-Fi Direct at one time (hereinafter, referred to as the number of simultaneous connections) is three.

Hardware Configuration of Image Processing Apparatus 10

Figure 2:
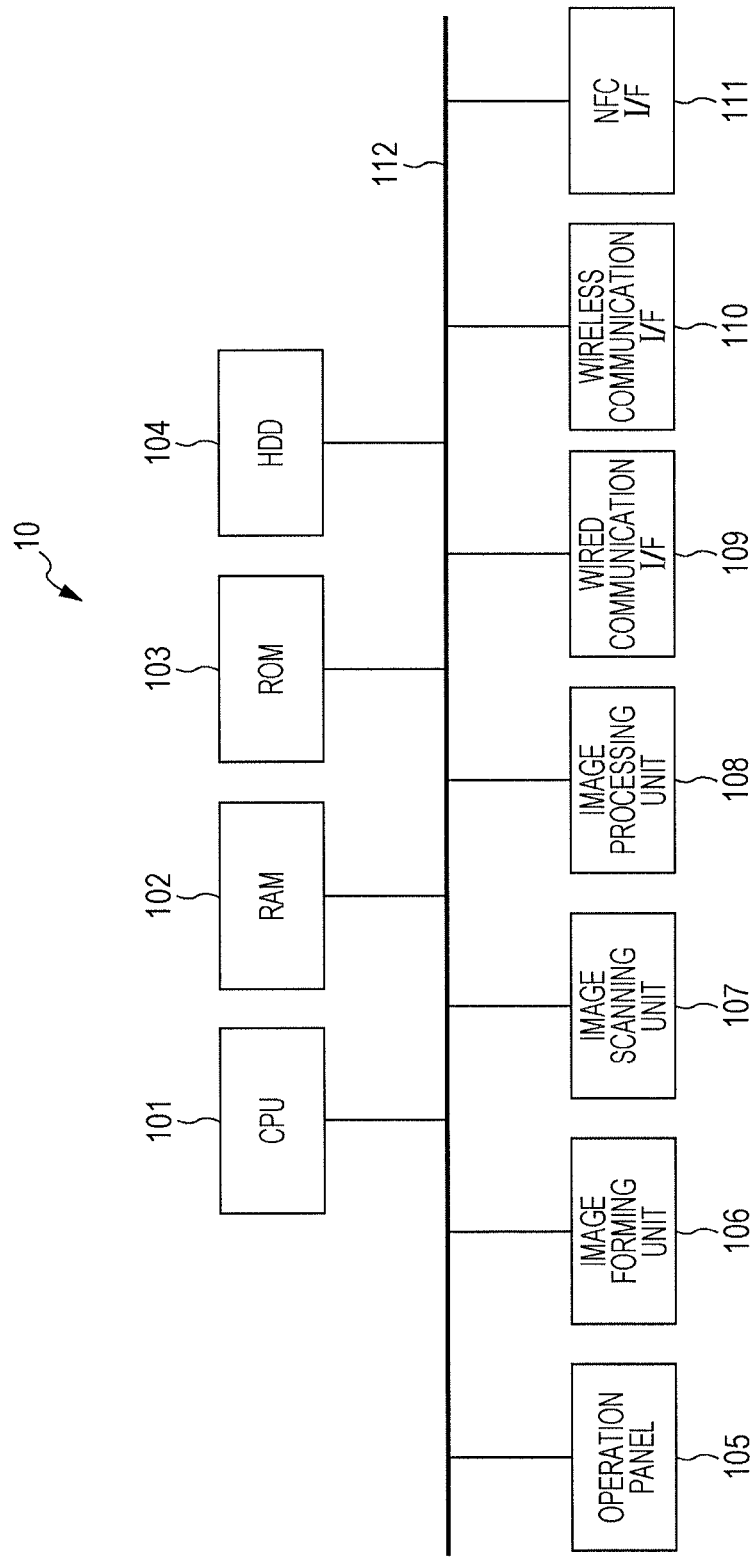
FIG. 2 illustrates an example of a hardware configuration of an image processing apparatus.

A hardware configuration of the image processing apparatus 10 will be described next. FIG. 2 illustrates an example of a hardware configuration of the image processing apparatus 10. As illustrated in FIG. 2, the image processing apparatus 10 includes a central processing unit (CPU) 101, a random access memory (RAM) 102, a read only memory (ROM) 103, a hard disk drive (HDD) 104, an operation panel 105, an image forming unit 106, an image scanning unit 107, an image processing unit 108, a wired communication interface (I/F) 109, a wireless communication I/F 110, and an NFC I/F 111, which are connected to a bus 112 and exchange data with one another via the bus 112.

The CPU 101 executes various kinds of software such as an operating system (OS) and applications. The RAM 102 is a memory that is used as, for example, a work memory of the CPU 101. The ROM 103 is a memory that stores, for example, various programs to be executed by the CPU 101. The CPU 101 loads the various programs stored in the ROM 103 or the like into the RAM 102 and executes the various programs so as to implement the functions of the image processing apparatus 10.

The HDD 104 is, for example, a magnetic disk device that stores image data or the like used in an image forming operation performed by the image forming unit 106.

The programs to be executed by the CPU 101 may be pre-stored in the ROM 103 or may be provided after being stored on a computer readable recording medium, such as a magnetic recording medium (such as a magnetic tape or a magnetic disk), an optical recording medium (such as an optical disc), a magneto-optical recording medium, or a semiconductor memory. Alternatively, the programs may be provided to the CPU 101 via the network 50, for example.

The operation panel 105 is a touch panel that displays various kinds of information and accepts an operation input from a user. The operation panel 105 includes a display that displays various kinds of information and a position detector sheet that detects a position touched with a finger or a stylus. Any detector, such as a detector that detects a touched position based on a pressure caused by the touch or based on a static electricity of an object that has touched, may be used to detect the touched position. In addition, a display and an input device such as a keyboard may be used in place of the touch panel.

The image forming unit 106 forms an image on a recording medium. For example, a printer such as an electrophotographic printer that transfers toner on a photoconductor onto a recording medium so as to form an image on the recording medium or an inkjet printer that ejects ink onto a recording medium so as to form an image on the recording medium may be used as the image forming unit 106.

The image scanning unit 107 scans an image on a recording medium and generates image data representing the image that has been scanned. The image scanning unit 107 is, for example, a scanner such as of a charge coupled device (CCD) system in which reflecting light of light that has been radiated onto an original from a light source is size-reduced by a lens and is received by CCDs or of a contact image sensor (CIS) system in which reflecting light of light that has been sequentially radiated onto an original from a light-emitting diode (LED) light source is received by a CIS.

The image processing unit 108 performs various types of image processing such as color correction and gradation correction on image data input thereto. For example, the image processing unit 108 performs various types of image processing on image data obtained by the image scanning unit 107 or image data stored in the HDD 104 and outputs the resulting data to the image forming unit 106.

The wired communication I/F 109 functions as a communication interface that enables transmission and reception of various kinds of data to and from the operation terminals 30 and the management server 40 via the network 50.

The wireless communication I/F 110 includes an antenna used, for example, for Wi-Fi Direct wireless communication with the mobile terminals 20 and functions as a communication interface that enables transmission and reception of various kinds of data to and from the mobile terminals 20.

The NFC I/F 111 includes an antenna used for NFC communication with the mobile terminals 20 and functions as a communication interface that enables transmission and reception of various kinds of data to and from the mobile terminals 20.

Hardware Configuration of Mobile Terminal 20

Figure 3:
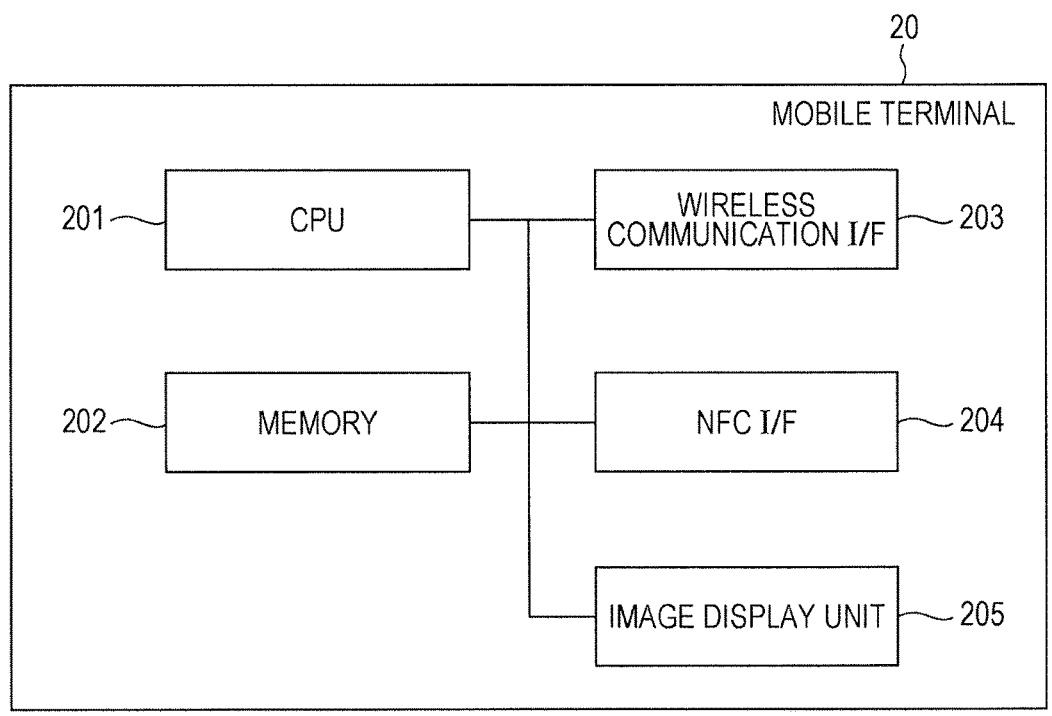
FIG. 3 illustrates an example of a hardware configuration of a mobile terminal.

FIG. 3 illustrates an example of a hardware configuration of the mobile terminal 20. As illustrated in FIG. 3, the mobile terminal 20 includes a CPU 201 and a memory 202. The CPU 201 executes various kinds of software such as an OS and applications. The memory 202 includes a storage area in which the various kinds of software, data used for execution of the various kinds of software, and so on are stored.

Programs to be executed by the CPU 201 may be pre-stored in the memory 202 or may be provided to the CPU 201 after being stored on a computer readable recording medium, such as a magnetic recording medium (such as a magnetic tape or a magnetic disk), an optical recording medium (such as an optical disc), a magneto-optical recording medium, or a semiconductor memory. Alternatively, the programs may be provided to the CPU 201 via the Internet, for example.

The mobile terminal 20 further includes a wireless communication I/F 203 and an NFC I/F 204 that enable wireless communication between the mobile terminal 20 and an external device, and an image display unit 205 that displays an image.

The wireless communication I/F 203 includes an antenna used, for example, for Wi-Fi Direct wireless communication with the image processing apparatus 10 and functions as a communication interface that transmits and receives various kinds of data to and from the image processing apparatus 10.

The NFC I/F 204 includes an antenna used for NFC communication with the image processing apparatus 10 and functions as a communication interface that transmits and receives various kinds of data to and from the image processing apparatus 10.

The image display unit 205 is, for example, a touch panel. Accordingly, the image display unit 205 includes a liquid crystal panel and a position detector (not illustrated) that detects a position of the liquid crystal panel that is touched by an object such as a human finger or a stylus when the liquid crystal panel is touched by the object. The touch panel used in the present exemplary embodiment is not limited to any particular type, and a touch panel of any given type such as a resistive film type or an electrostatic capacitive type may be used.

The mobile terminal 20 may include, for example, an HDD or a flash memory as a memory. An HDD or a flash memory stores data to be input to various kinds of software and data output from the various kinds of software, for example. The mobile terminal 20 may further include an input device, such as a keyboard or a mouse.

In the above-described image processing system 1, the mobile terminals 20 and the operation terminals 30 transmit a print job to the image processing apparatuses 10 via the network 50 or Wi-Fi Direct wireless communication. In this way, printing is performed by the image processing apparatuses 10.

The management server 40 is capable of managing print jobs to be executed by the image processing apparatus 10, rearranging the print jobs in an appropriate order, and transmitting the print jobs to the image processing apparatus 10. In this case, the management server 40 functions as a print server. The management server 40 is capable of managing files so as to allow the files to be shared among the mobile terminals 20 and the operation terminals 30. In this case, the management server 40 functions as a file server.

Functional Configuration of Image Processing Apparatus 10

Now, a functional configuration of the image processing apparatus 10 will be described. The image processing apparatus 10 performs a queueing process and a job data reception process so as to receive a print job from the mobile terminal 20 and perform a printing process. In the present exemplary embodiment, the image processing apparatus 10 serves as an example of an information processing apparatus.

The queueing process is a process in which the image processing apparatus 10 accepts a request for a printing process from the mobile terminal 20 after a Wi-Fi Direct connection has been established between the image processing apparatus 10 and the mobile terminal 20 and registers content of the accepted request. Examples of information registered through the queueing process include information concerning the mobile terminal 20 that has transmitted the request for a printing process and information concerning a print job subjected to printing. Note that the image processing apparatus 10 does not receive and store a print job but stores information indicating that there has been a request for a printing process for a print job through the queueing process. After the queueing process, the Wi-Fi Direct connection between the image processing apparatus 10 and the mobile terminal 20 is temporarily disconnected.

The job data reception process is a process in which the image processing apparatus 10 transmits a print job transmission request to the mobile terminal 20 and receives a print job from the mobile terminal 20. Before performing the job data reception process, the image processing apparatus 10 transmits a Wi-Fi Direct connection request to the mobile terminal 20 by using the information registered through the queueing process. After a connection has been established between the image processing apparatus 10 and the mobile terminal 20, the image processing apparatus 10 transmits a print job transmission request to the mobile terminal 20 and receives a print job from the mobile terminal 20.

The image processing apparatus 10 uses different channels for the queueing process and the job data reception process. The term "channel" refers to a frequency band used for transmission and reception of data. For example, a standard called IEEE 802.11g provides a total of 13 channels (i.e., channels 1 to 13) in a 2.4-GHz frequency band. A description will be given below on the assumption that the image processing apparatus 10 uses channel 6 as an example of a first frequency band during the queueing process and channel 1 as an example of a second frequency band during the job data reception process. Note that a combination of channels used is not limited to this particular combination, and any given combination of non-overlapping frequency bands such as a combination of channels 6 and 11 may be used.

Figure 4:
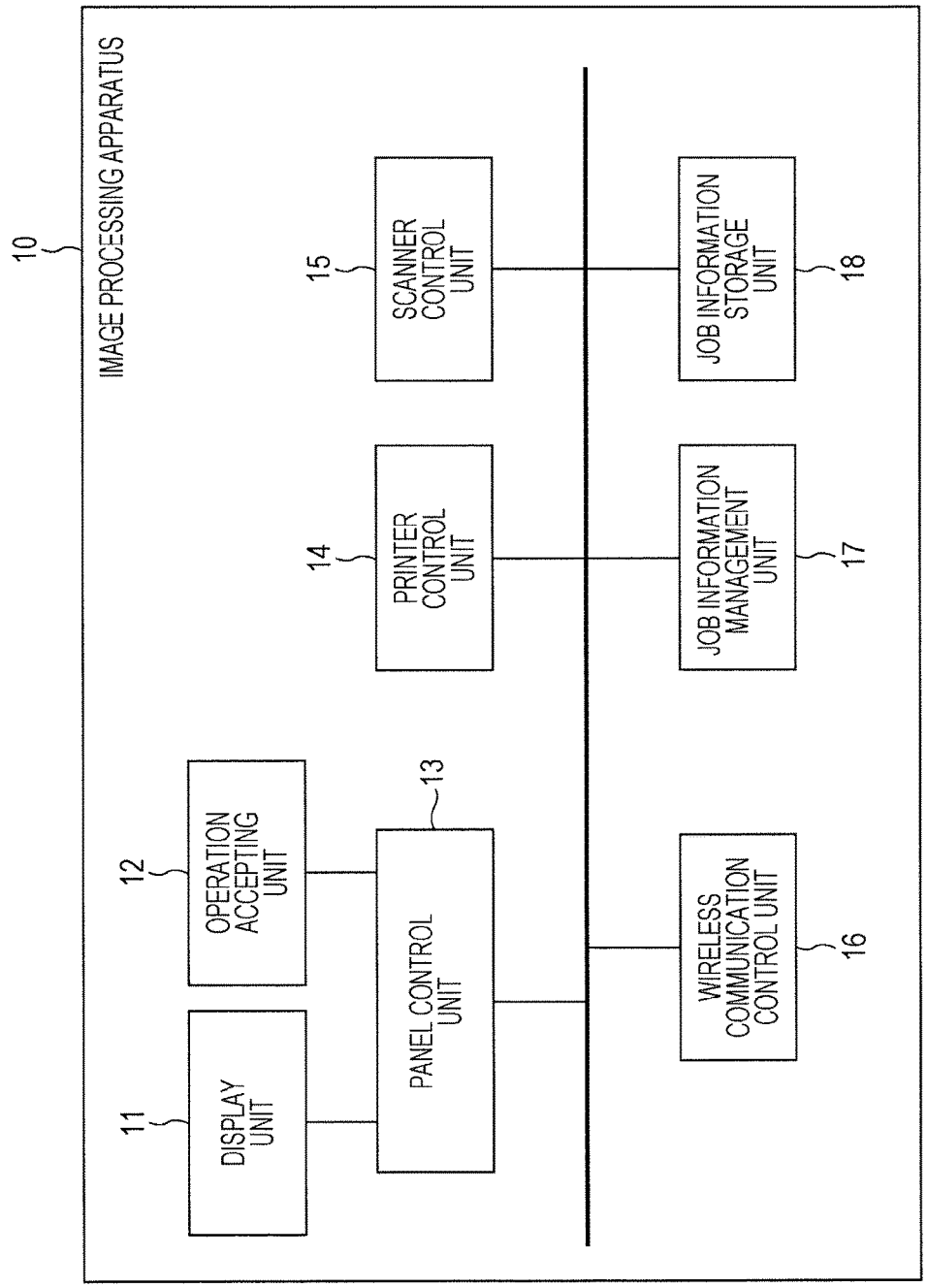
FIG. 4 is a block diagram illustrating an example of a functional configuration of the image processing apparatus.

FIG. 4 is a block diagram illustrating an example of a functional configuration of the image processing apparatus 10. The image processing apparatus 10 includes a display unit 11, an operation accepting unit 12, a panel control unit 13, a printer control unit 14, a scanner control unit 15, a wireless communication control unit 16, a job information management unit 17, and a job information storage unit 18.

The display unit 11 displays various images, for example, on the operation panel 105 under control of the panel control unit 13.

The operation accepting unit 12 accepts a user operation input which is entered by the user touching the operation panel 105, for example.

The panel control unit 13 controls operations of the display unit 11 and the operation accepting unit 12.

The printer control unit 14, which is an example of a process performing unit, controls an operation of the image forming unit 106 or the like so as to perform a printing process for a print job.

The scanner control unit 15, which is an example of an image data generating unit, controls an operation of the image scanning unit 107 or the like so as to perform a scan.

The wireless communication control unit 16, which is an example of a first communication unit and a second communication unit, controls a Wi-Fi Direct connection. The wireless communication control unit 16 performs a process for accepting a Wi-Fi Direct connection request from the mobile terminal 20 and establishing a Wi-Fi Direct connection to the mobile terminal 20 and a process for transmitting a Wi-Fi Direct connection request to the mobile terminal 20 and establishing a Wi-Fi Direct connection to the mobile terminal 20. In addition, the wireless communication control unit 16 receives a print job from the mobile terminal 20 via Wi-Fi Direct wireless communication. In the present exemplary embodiment, communication performed via a Wi-Fi Direct connection during the queueing process is an example of first communication. In addition, communication performed via a Wi-Fi Direct connection during the job data reception process is an example of second communication.

The job information management unit 17, which is an example of a request accepting unit, the second communication unit, and the process performing unit, performs the queueing process and the job data reception process. After a connection has been established in response to a Wi-Fi Direct connection request from the mobile terminal 20, the job information management unit 17 receives a request for a printing process for a print job from the mobile terminal 20 by using channel 6 and creates a table (hereinafter, referred to as a job information management table) in which content of the requested printing process is recorded through the queueing process.

The connection is then temporarily disconnected. If a condition under which a printing process for the print job is performed is satisfied, a connection to the mobile terminal 20 is re-established by the wireless communication control unit 16. Then, the job information management unit 17 transmits a print job transmission request to the mobile terminal 20 by using channel 1 and receives a print job associated with the request for a printing process made by the mobile terminal 20 through the job data reception process. In the present exemplary embodiment, a printing process for a print job is an example of a data processing process.

In the present exemplary embodiment, a printing process for a print job is performed under the condition that all printing processes (hereinafter, referred to as preceding processes) for print jobs which the image processing apparatus 10 is requested to perform through connection requests that precede the connection request of the mobile terminal 20 have been finished. That is, if all the preceding processes have been finished after the temporal disconnection of the connection to the mobile terminal 20, the wireless communication control unit 16 determines that the condition under which a printing process for the print job requested by the mobile terminal 20 is performed is satisfied and re-establishes a connection to the mobile terminal 20.

If no other mobile terminal 20 is connected to the image processing apparatus 10 when a connection request is made by the mobile terminal 20, it is determined that no preceding process is present and that the condition under which a printing process for the print job is performed is already satisfied. Thus, the job information management unit 17 receives a print job processing request from the mobile terminal 20 by using channel 1. Further, the job information management unit 17 performs the job data reception process and receives a print job from the mobile terminal 20, while maintaining the connection to the mobile terminal 20 instead of disconnecting it.

The job information storage unit 18, which is an example of a memory, stores the job information management table. The job information management table is created in response to a print job processing request transmitted from the mobile terminal 20. The job information management table is referred to by the wireless communication control unit 16 when the wireless communication control unit 16 transmits a Wi-Fi Direct connection request to the mobile terminal 20 in order to perform the job data reception process. In the present exemplary embodiment, information registered in the job information management table is an example of information concerning a data processing process. Details about the job information management table will be described later.

In accordance with instructions executed by the CPU 101, functional units such as the panel control unit 13, the printer control unit 14, the scanner control unit 15, the wireless communication control unit 16, and the job information management unit 17 are implemented in the image processing apparatus 10, for example. In addition, the display unit 11 and the operation accepting unit 12 are implemented by the operation panel 105, for example. Further, the wireless communication control unit 16 is implemented by the wireless communication I/F 110, for example. Moreover, the job information storage unit 18 is implemented by the HDD 104, for example.

Functional Configuration of Mobile Terminal 20

Now, a functional configuration of the mobile terminal 20 will be described. The mobile terminal 20 causes application software for creating image data or the like that is subjected to image formation by the image processing apparatus 10 to run and transmits a print job for printing image data to the image processing apparatus 10. Before transmitting a print job, the mobile terminal 20 first transmits a Wi-Fi Direct connection request to the image processing apparatus 10. After a connection to the image processing apparatus 10 has been established, the mobile terminal 20 transmits a request for a printing process to the image processing apparatus 10. The Wi-Fi Direct connection is then temporarily disconnected. The mobile terminal 20 then accepts a Wi-Fi Direct connection request from the image processing apparatus 10 and transmits a print job to the image processing apparatus 10 after the connection has been established. In the present exemplary embodiment, the mobile terminal 20 serves as an example of a terminal apparatus.

Figure 5:
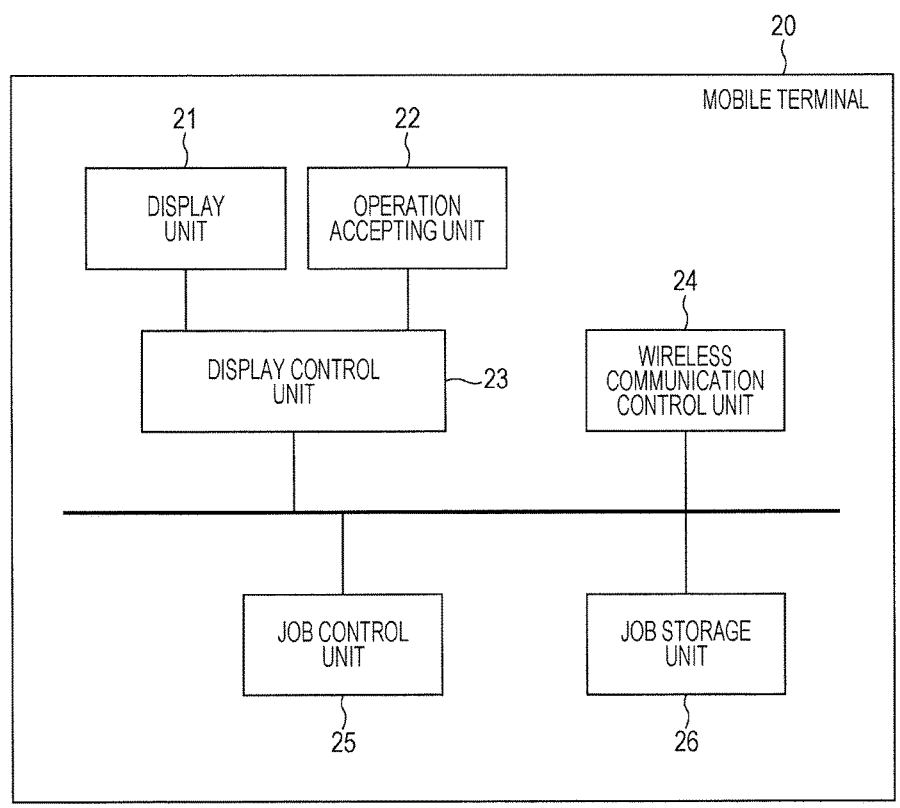
FIG. 5 is a block diagram illustrating an example of a functional configuration of the mobile terminal.

FIG. 5 is a block diagram illustrating an example of a functional configuration of the mobile terminal 20. The mobile terminal 20 includes a display unit 21, an operation accepting unit 22, a display control unit 23, a wireless communication control unit 24, a job control unit 25, and a job storage unit 26.

The display unit 21 displays various images, for example, on the image display unit 205 under control of the display control unit 23.

The operation accepting unit 22 accepts a user operation input which is entered by the user touching the image display unit 205, for example.

The display control unit 23 controls operations of the display unit 21 and the operation accepting unit 22.

The wireless communication control unit 24, which is an example of a third communication unit and a fourth communication unit, controls a Wi-Fi Direct connection. The wireless communication control unit 24 performs a process for accepting a Wi-Fi Direct connection request from the image processing apparatus 10 and establishing a Wi-Fi Direct connection to the image processing apparatus 10 and a process for transmitting a Wi-Fi Direct connection request to the image processing apparatus 10 and establishing a Wi-Fi Direct connection to the image processing apparatus 10. In addition, the wireless communication control unit 24 transmits a print job to the image processing apparatus 10 via Wi-Fi Direct wireless communication. In the present exemplary embodiment, communication performed via a Wi-Fi Direct connection during the queueing process is an example of third communication. In addition, communication performed via a Wi-Fi Direct connection during the job data reception process is an example of fourth communication.

The job control unit 25, which is an example of a process requesting unit and a processing unit, performs control so as to transmit a print job to the image processing apparatus 10. Upon establishment of a Wi-Fi Direct connection after the wireless communication control unit 24 has transmitted a Wi-Fi Direct connection request to the image processing apparatus 10, the job control unit 25 transmits a print job processing request to the image processing apparatus 10. Upon receipt of a print job transmission request from the image processing apparatus 10, the job control unit 25 transmits a print job associated with the print job processing request to the image processing apparatus 10.

The job storage unit 26 stores a print job that has been generated to print image data.

In accordance with instructions executed by the CPU 201, functional units such as the display control unit 23, the wireless communication control unit 24, and the job control unit 25 are implemented in the mobile terminal 20, for example. In addition, the display unit 21 and the operation accepting unit 22 are implemented by the image display unit 205, for example. Further, the wireless communication control unit 24 is implemented by the wireless communication I/F 203, for example. Moreover, the job storage unit 26 is implemented by the memory 202, an HDD, or a flash memory, for example.

Content of Job Information Management Table

Content of the job information management table stored in the job information storage unit 18 will be described next. FIG. 6 illustrates an example of the job information management table.

A "TABLE NO." field stores a number assigned to a job information management table. For example, "1" is assigned to the firstly created job information management table, and a number is assigned in accordance with the creation order. A "JOB ID" field stores an identifier (job ID) that is assigned to a print job in order to identify the print job and that indicates the print job associated with the corresponding print job processing request by the mobile terminal 20. Specifically, a job ID is represented by a given character string or timestamp, for example.

A "MAC ADDRESS" field stores the media access control (MAC) address of the mobile terminal 20 that has transmitted the print job processing request. A "DEVICE NAME" field stores a name (device name) that has been registered in advance in the mobile terminal 20 that has transmitted the print job processing request. A "PMK" field stores a master key (Pairwise Master Key (PMK)) which is used in an encryption standard called Wi-Fi Protected Access (WPA) and from which various keys are derived. The PMK is used when a Wi-Fi Direct connection is established between the image processing apparatus 10 and the mobile terminal 20. A "PASSPHRASE" field stores a passphrase used in WPA. Like the PMK, the passphrase is used when a Wi-Fi Direct connection is established between the image processing apparatus 10 and to the mobile terminal 20.

In the example illustrated in FIG. 6, the job information management table is assigned the table No. "1" and stores "AA01" as the job ID of a print job associated with the print job processing request by the mobile terminal 20. In the illustrated example, only one job ID is registered; however, in the case where multiple print jobs are generated by the mobile terminal 20 and multiple job IDs are transmitted from the mobile terminal 20 as a target of the processing request, the multiple job IDs are registered in the job information management table. In addition, the MAC address and the device name of the mobile terminal 20 that has transmitted the print job processing request are "BBBB" and "MOBILE A", respectively. In addition, "XXX" and "YYY" are respectively used as the PMK and the passphrase to establish a Wi-Fi Direct connection between the image processing apparatus 10 and the mobile terminal 20.

Procedure of Process by Image Processing Apparatus 10

Figure 7B:
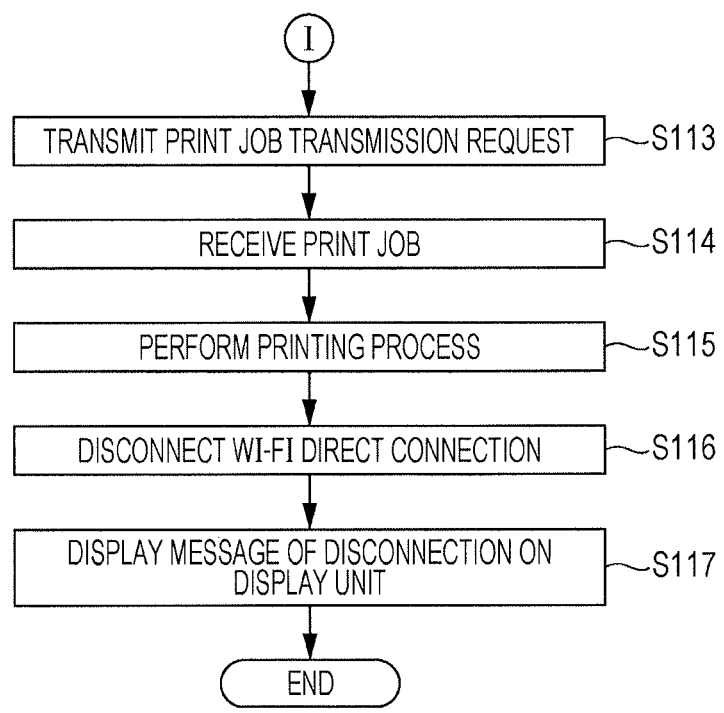

A process performed by the image processing apparatus 10 will be described next. FIGS. 7A and 7B are flowcharts illustrating an example of a procedure of a process performed by the image processing apparatus 10 to perform a printing process. The example illustrated in FIGS. 7A and 7B will be described regarding a case where a connection is established between the image processing apparatus 10 and the mobile terminal 20A.

Upon receipt of a Wi-Fi Direct connection request from the mobile terminal 20A, the wireless communication control unit 16 accepts the Wi-Fi Direct connection request (step S101). The wireless communication control unit 16 then transmits a response indicating acceptance of the Wi-Fi Direct connection request to the mobile terminal 20A. If the number of simultaneous connections has reached the maximum number of connections allowed, a new connection is not established. In such a case, the wireless communication control unit 16 transmits a response indicating rejection of the Wi-Fi Direct connection request to the mobile terminal 20A. After accepting the Wi-Fi Direct connection request, the wireless communication control unit 16 determines whether any other mobile terminal 20 is connected to the image processing apparatus 10 by Wi-Fi Direct (step S102).

If another mobile terminal 20 is connected to the image processing apparatus 10 (YES in step S102), the wireless communication control unit 16 shares with the mobile terminal 20A setting information used to establish a Wi-Fi Direct connection (step S103). Through the process of sharing the setting information, the image processing apparatus 10 is selected as the P2P group owner. The image processing apparatus 10 now serving as the P2P group owner assigns an IP address to the mobile terminal 20A and decides upon a channel used for the queueing process (channel 6), and shares with the mobile terminal 20A the IP address and the channel as the setting information. In addition, the PMK and the passphrase are also shared as the setting information. As a result of sharing the setting information in this manner, a Wi-Fi Direct connection is established between the image processing apparatus 10 and the mobile terminal 20A.

If it is determined in step S102 that no other mobile terminal 20 is connected to the image processing apparatus 10 (NO in step S102), the wireless communication control unit 16 shares with the mobile terminal 20A setting information used to establish a Wi-Fi Direct connection (step S104). In this case, the wireless communication control unit 16 determines that no preceding process is present and decides to use channel 1 which is a channel different from that used in step S103 and which is used for the job data reception process. Substantially the same processing is performed in step S104 as that of step S103 except that a different channel is decided to be used. In this way, a Wi-Fi Direct connection is established between the image processing apparatus 10 and the mobile terminal 20A.

After a Wi-Fi Direct connection has been established in step S103, the job information management unit 17 receives a print job processing request from the mobile terminal 20A via the wireless communication control unit 16 by using channel 6 (step S105). The process then proceeds to step S107. After a Wi-Fi Direct connection has been established in step S104, the job information management unit 17 receives a print job processing request from the mobile terminal 20A by using channel 1 (step S106). In this case, the process proceeds to step S113 (described later) after step S106.

After step S105, the job information management unit 17 registers and stores content of the print job processing request received from the mobile terminal 20A in the job information management table (step S107). Note that the job information management table illustrated in FIG. 6 is created for each print job processing request that has been received, and information is registered in the individual fields. Specifically, the job information management unit 17 registers and stores the job ID of a print job associated with the print job processing request that has been received from the mobile terminal 20A and the MAC address of the mobile terminal 20A in the job information management table as information indicating that there has been a request for a printing process for a print job. In addition, the job information management unit 17 registers the device name of the mobile terminal 20A and the PMK and the passphrase that are used to establish a connection to the mobile terminal 20A in the job information management table. Processing of steps S105 and S107 corresponds to the queueing process.

The wireless communication control unit 16 then temporarily disconnects the Wi-Fi Direct connection to the mobile terminal 20A (step S108). At this time, the wireless communication control unit 16 notifies the mobile terminal 20A of disconnection of the Wi-Fi Direct connection. In response to this notification, the mobile terminal 20A performs a process for disconnecting the Wi-Fi Direct connection to the image processing apparatus 10. The panel control unit 13 then displays a message indicating that the Wi-Fi Direct connection to the mobile terminal 20A has been disconnected on the display unit 11 (step S109).

The wireless communication control unit 16 then determines whether the printer control unit 14 is performing a printing process (step S110). For example, in the case where a printing process is being performed for a print job that has been received from the mobile terminal 20 different from the mobile terminal 20A, it is determined that a printing process is being performed. If a printing process is being performed (YES in step S110), the wireless communication control unit 16 stands by until the printing process ends. If a printing process is not being performed (NO in step S110), the wireless communication control unit 16 determines that the condition under which a printing process for the print job requested by the mobile terminal 20A is performed is satisfied and transmits a Wi-Fi Direct connection request to the mobile terminal 20A with reference to the job information management table (step S111). At this time, the wireless communication control unit 16 transmits a Wi-Fi Direct connection request by using the MAC address of the mobile terminal 20A which is stored in the job information management table in step S107.

Upon receipt of a response indicating acceptance of the Wi-Fi Direct connection request from the mobile terminal 20A, the wireless communication control unit 16 shares with the mobile terminal 20A setting information used to establish a Wi-Fi Direct connection (step S112). As in steps S103 and S104, the setting information is shared between the image processing apparatus 10 and the mobile terminal 20A in step S112. In this case, the wireless communication control unit 16 decides to use the channel for the job data reception process (channel 1). As a result of sharing the setting information, a Wi-Fi Direct connection is established between the image processing apparatus 10 and the mobile terminal 20A.

After a Wi-Fi Direct connection has been established in step S112 or after the job information management unit 17 has received a print job processing request from the mobile terminal 20A in step S106, the job information management unit 17 transmits a print job transmission request to the mobile terminal 20A by using channel 1 (step S113). Specifically, after a Wi-Fi Direct connection has been established in step S112, the job information management unit 17 transmits a print job transmission request for transmitting a print job assigned the job ID stored in the job information management table in step S107 (i.e., a print job subjected to a process indicated by the print job processing request that has been received in step S105). The job information management unit 17 then receives by using channel 1 the print job subjected to the process indicated by the print job processing request that has been received in step S105 or S106 (step S114). Processing of steps S113 and S114 corresponds to the job data reception process.

The printer control unit 14 then performs a printing process for the received print job (step S115). After the printing process has been completed, the job information management unit 17 deletes, from the job information management table, information concerning the print job for which the printing process has been completed. In addition, the wireless communication control unit 16 disconnects the Wi-Fi Direct connection to the mobile terminal 20A (step S116). At this time, the wireless communication control unit 16 notifies the mobile terminal 20A of disconnection of the Wi-Fi Direct connection. In response to the notification, the mobile terminal 20A performs a process for disconnecting the Wi-Fi Direct connection to the image processing apparatus 10. The panel control unit 13 then displays a message indicating that the Wi-Fi Direct connection to the mobile terminal 20A has been disconnected on the display unit 11 (step S117). The process then ends.

As described above, the image processing apparatus 10 establishes a connection after accepting a connection request from the mobile terminal 20, and temporarily disconnects the connection to the mobile terminal 20 after performing the queueing process. Then, the image processing apparatus 10 transmits a connection request to the mobile terminal 20 by using information registered through the queueing process and performs the job data reception process. In addition, if no other mobile terminal 20 is connected to the image processing apparatus 10 when a connection request from the mobile terminal 20 is accepted, the image processing apparatus 10 performs the job data reception process without disconnecting the connection.

In the example illustrated in FIGS. 7A and 7B, the process proceeds to step S103 if it is determined in step S102 that another mobile terminal 20 is connected to the image processing apparatus 10 (YES in step S102); however, even in the case where another communication terminal 20 is connected to the image processing apparatus 10, the process may proceed to step S104 if processing of the print job requested by the mobile terminal 20 has been finished. Further, even in the case where it is determined in step S102 that no other mobile terminal 20 is connected to the image processing apparatus 10 (NO in step S102), the process proceeds to step S103 if a process has been stored in the job information management table at that time because the process is performed first.

Further, in step S111, the wireless communication control unit 16 transmits a connection request to the mobile terminal 20A if the printing process is not being performed; however, if another mobile terminal 20 (e.g., the mobile terminal 20B) has transmitted a print job processing request before the mobile terminal 20A transmits it, the wireless communication control unit 16 transmits a connection request to the mobile terminal 20B. Specifically, if a connection request of the mobile terminal 20B is accepted before a connection request of the mobile terminal 20A is accepted and a print job processing request is received from the mobile terminal 20B, the wireless communication control unit 16 transmits a connection request to the mobile terminal 20B before transmitting a connection request to the mobile terminal 20A. A printing process is then performed first for a print job that has been transmitted from the mobile terminal 20B. After the preceding process that precedes the process requested by the mobile terminal 20A has been finished, the condition under which a printing process for the print job requested by the mobile terminal 20A is performed is satisfied, and a connection request is transmitted to the mobile terminal 20A.

In addition, in the case where the mobile terminal 20A to which a Wi-Fi Direct connection request is transmitted in step S111 has moved to a remote area and has not accepted the connection request, a timeout occurs because a notification indicating acceptance of the connection request is not received within a certain period of time. In such a case, the wireless communication control unit 16 may transmit a Wi-Fi Direct connection request to another mobile terminal 20 by using content of the next registered print job processing request and may change the order of the printing processes.

Procedure of Process by Mobile Terminal 20

Figure 8:
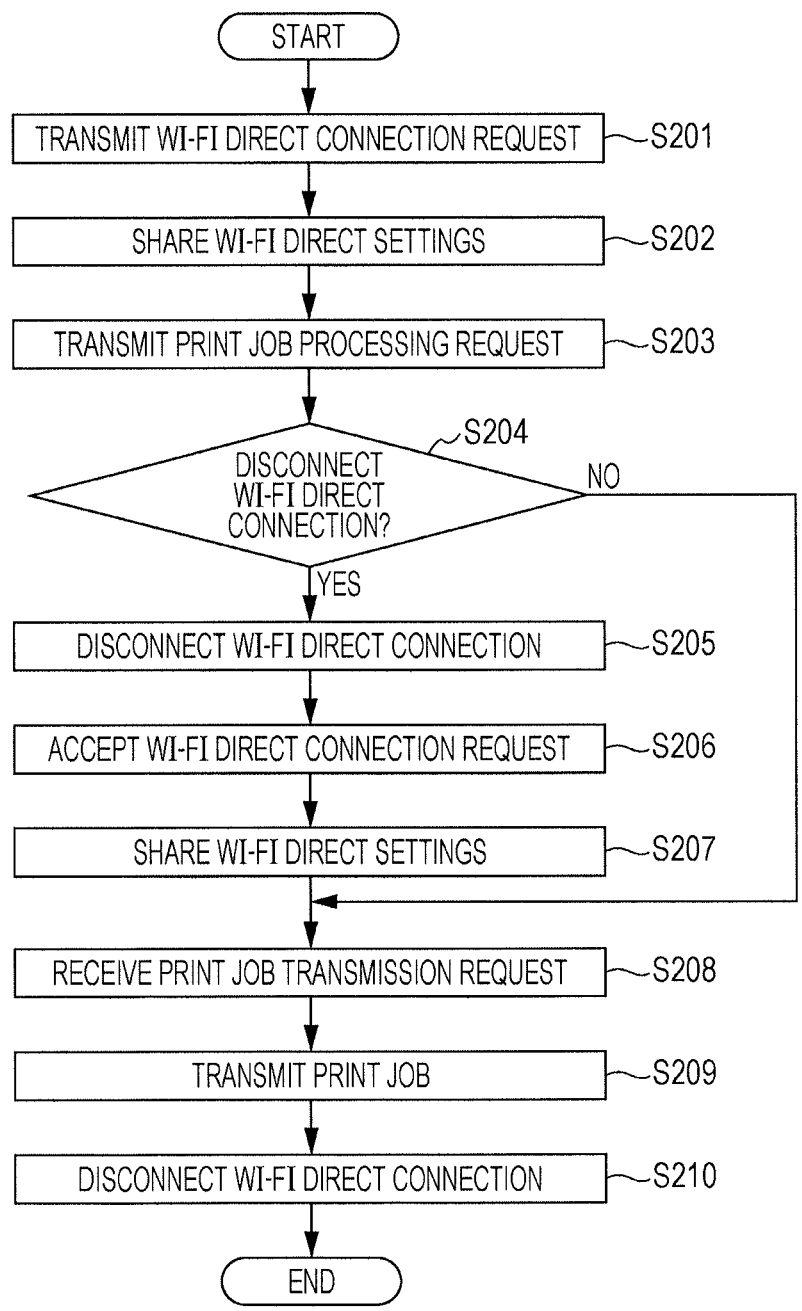
FIG. 8 is a flowchart illustrating an example of a procedure of a process performed by the mobile terminal to transmit a print job processing request and transmit a print job.

A process performed by the mobile terminal 20 will be described next. FIG. 8 is a flowchart illustrating an example of a procedure of a process performed by the mobile terminal 20A to transmit a print job processing request and to transmit a pint job. As described above, the mobile terminal 20A searches for a P2P device that serves as a Wi-Fi Direct connection designation candidate by exchanging a signal with other P2P devices, and it is assumed in the example illustrated in FIG. 8 that the mobile terminal 20A has detected the image processing apparatus 10 as the connection destination candidate. In addition, it is assumed that a user has selected, using the mobile terminal 20, a document or the like to be printed and that a print job associated with the print job processing request has been generated by the mobile terminal 20.

First, the wireless communication control unit 24 transmits a Wi-Fi Direct connection request to the image processing apparatus 10 (step S201). At this time, a list of P2P devices that have been detected as the connection destination candidates is displayed on the display unit 21 of the mobile terminal 20. Thus, the user selects the image processing apparatus 10 from the list. In the list of P2P devices, for example, device names or MAC addresses of the devices are displayed. After the image processing apparatus 10 has been selected by the user, the wireless communication control unit 24 transmits a Wi-Fi Direct connection request. The Wi-Fi Direct connection request transmitted in step S201 is accepted in step S101 of FIG. 7A.

After receiving a response indicating acceptance of the Wi-Fi Direct connection request from the image processing apparatus 10, the wireless communication control unit 24 shares with the image processing apparatus 10 setting information used to establish a Wi-Fi Direct connection (step S202). As in steps S103 and S104 of FIG. 7A, the setting information is shared between the image processing apparatus 10 and the mobile terminal 20 in this step, and consequently a Wi-Fi Direct connection is established between the image processing apparatus 10 and the mobile terminal 20.

The job control unit 25 then transmits a print job processing request to the image processing apparatus 10 (step S203). With the print job processing request, the image processing apparatus 10 is notified of the job ID of the print job associated with the print job processing request. At this time, if the use of channel 6 is decided in step S202, the job control unit 25 transmits a print job processing request by using channel 6. The print job processing request transmitted by using channel 6 is received in step S105 of FIG. 7A. In contrast, if the use of channel 1 is decided in step S202, the job control unit 25 transmits a print job processing request by using channel 1. The print job processing request transmitted by using channel 1 is received in step S106 of FIG. 7A.

The wireless communication control unit 24 then determines whether a notification indicating disconnection of the Wi-Fi Direct connection has been received (step S204). If a notification indicating disconnection of the Wi-Fi Direct connection has been transmitted in step S108 of FIG. 7A, the wireless communication control unit 24 determines that the notification indicating disconnection has been received. If the notification indicating disconnection has been received (YES in step S204), the wireless communication control unit 24 performs a process for temporarily disconnecting the Wi-Fi Direct connection (step S205). If a Wi-Fi Direct connection request is transmitted in step S111 of FIG. 7A, the wireless communication control unit 24 accepts the Wi-Fi Direct connection request (step S206). In addition, the wireless communication control unit 24 transmits a response indicating acceptance of the Wi-Fi Direct connection request to the image processing apparatus 10.

The wireless communication control unit 24 then shares with the image processing apparatus 10 setting information used to establish a Wi-Fi Direct connection (step S207). As in step S112 of FIG. 7A, the setting information is shared between the image processing apparatus 10 and the mobile terminal 20 in this step, and consequently a Wi-Fi Direct connection is established between the image processing apparatus 10 and the mobile terminal 20. In addition, the use of the channel for the job data reception process (channel 1) is decided.

After a Wi-Fi Direct connection has been established in step S207 or if a notification indicating disconnection has not been received in step S204 (NO in step S204), the job control unit 25 receives a print job transmission request by using channel 1 (step S208) as a result of the print job transmission request being transmitted in step S113 of FIG. 7B. The job control unit 25 then transmits a print job requested by the received print job transmission request (i.e., a print job associated with the print job processing request that has been transmitted in step S203) to the image processing apparatus 10 by using channel 1 (step S209). Then, in response to a notification indicating disconnection of the Wi-Fi Direct connection transmitted in step S116 of FIG. 7B, the wireless communication control unit 24 performs a process for disconnecting the Wi-Fi Direct connection (step S210). The process then ends.

As described above, the mobile terminal 20 transmits a connection request to the image processing apparatus 10, establishes a connection to the image processing apparatus 10, and transmits a print job processing request to the image processing apparatus 10. Upon receipt of a print job transmission request from the image processing apparatus 10, the mobile terminal 20 transmits a print job to the image processing apparatus 10.

As described above, the image processing apparatus 10 according to the present exemplary embodiment establishes a connection after accepting a connection request from the mobile terminal 20, and temporarily disconnects the connection to the mobile terminal 20 after performing the queueing process. The image processing apparatus 10 then transmits a connection request to the mobile terminal 20 by using information registered through the queueing process and performs the job data reception process.

In addition, content of a print job processing request is registered through the queueing process, and a connection request is transmitted from the image processing apparatus 10 to the mobile terminal 20 when the mobile terminal 20's turn comes.

Further, different channels are used for the queueing process and the job data reception process.

Second Exemplary Embodiment

A second exemplary embodiment will be described next. In the first exemplary embodiment, the mobile terminal 20 transmits a print job to the image processing apparatus 10, and the image processing apparatus 10 performs a printing process. In the second exemplary embodiment, the image processing apparatus 10 performs a scan and displays information concerning image data (hereinafter, referred to as scan data) representing a scanned image on the display unit 11. After a user selects a scan data by using the mobile terminal 20, the image processing apparatus 10 transmits the selected scan data to the mobile terminal 20. A description will be given of the case where the image processing apparatus 10 displays an identifier (hereinafter, referred to as scan data ID) assigned to identify scan data on the display unit 11 as the information concerning scan data and a user selects, by using the mobile terminal 20, the scan data ID of scan data which the user wish to acquire. In the present exemplary embodiment, a scan data transmission process is an example of the data processing process.

In the first exemplary embodiment, the image processing apparatus 10 accepts a print job processing request from the mobile terminal 20 and registers content of the received print job processing request through the queueing process. In contrast, in the second exemplary embodiment, the image processing apparatus 10 accepts a scan data transmission request from the mobile terminal 20 and registers content of the accepted scan data transmission request through the queueing process.

Further, in the first exemplary embodiment, the image processing apparatus 10 transmits a print job transmission request to the mobile terminal 20 and receives a print job from the mobile terminal 20 through the job data reception process. In contrast, in the second exemplary embodiment, the image processing apparatus 10 transmits scan data to the mobile terminal 20 and the mobile terminal 20 receives the scan data through the job data reception process.

In the second exemplary embodiment, components similar to those described in the first exemplary embodiment are denoted by the same reference numerals, and a detailed description thereof is omitted.

Procedure of Process by Image Processing Apparatus 10

Figure 9A:
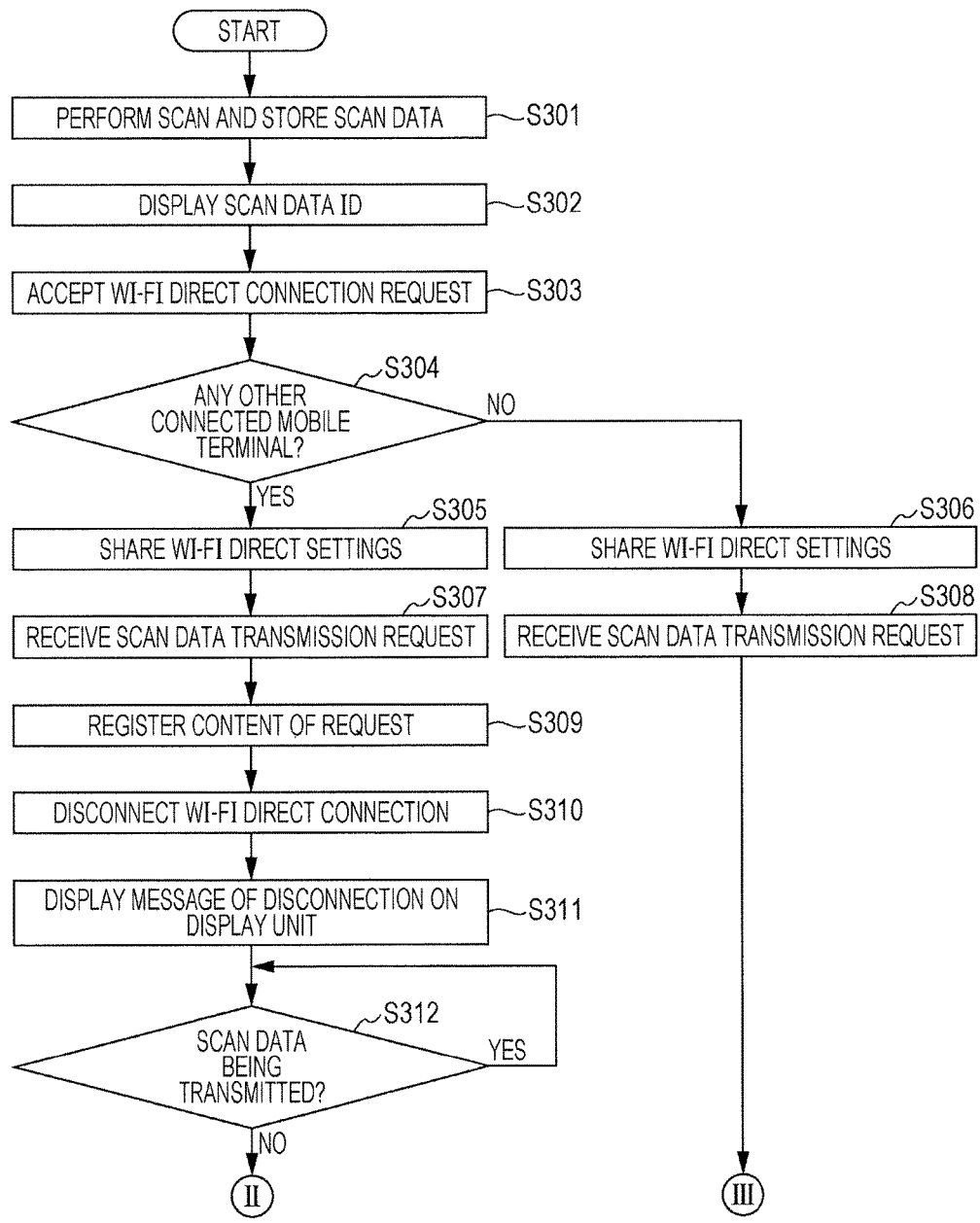
FIGS. 9A and 9B are flowcharts illustrating an example of a procedure of a process performed by the image processing apparatus to perform a scan and transmit scan data.
Figure 9B:
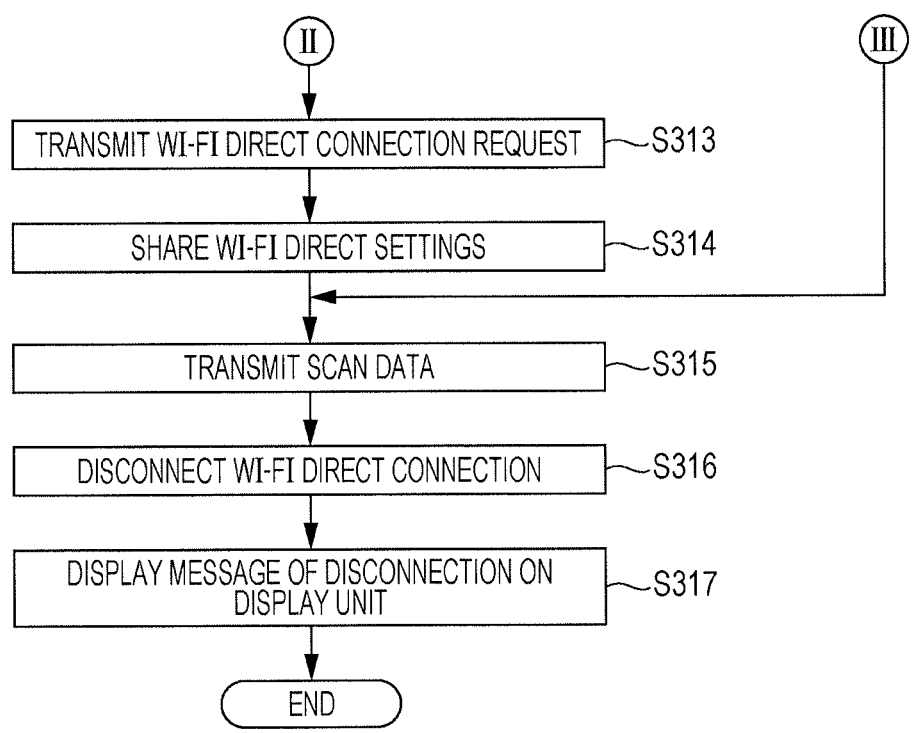

A process performed by the image processing apparatus 10 will be described first. FIGS. 9A and 9B are flowcharts illustrating an example of a procedure of a process performed by the image processing apparatus 10 to perform a scan and transmit scan data. A description of the example illustrated in FIGS. 9A and 9B is given of the case where a connection is established between the mobile terminal 20A and the image processing apparatus 10.

First, the scanner control unit 15 performs a scan and stores scan data in the job information storage unit 18 (step S301). Then, the panel control unit 13 displays a scan data ID on the display unit 11 (step S302). Upon receipt of a Wi-Fi Direct connection request from the mobile terminal 20A, the wireless communication control unit 16 accepts the Wi-Fi Direct connection request (step S303). The wireless communication control unit 16 also transmits a response indicating acceptance of the Wi-Fi Direct connection request to the mobile terminal 20A. At this time, if the number of simultaneous connections has reached the maximum number of connections allowed, the wireless communication control unit 16 transmits a response indicating rejection of the Wi-Fi Direct connection request to the mobile terminal 20A.

After accepting the Wi-Fi Direct connection request, the wireless communication control unit 16 determines whether any other mobile terminal 20 is connected to the image processing apparatus 10 by Wi-Fi Direct (step S304). If another mobile terminal 20 is connected to the image processing apparatus 10 (YES in step S304), the wireless communication control unit 16 shares with the mobile terminal 20A setting information used to establish a Wi-Fi Direct connection (step S305). Processing similar to that of step S103 of FIG. 7A is performed in this step, and the use of the channel for the queueing process (channel 6) is decided. Consequently, a Wi-Fi Direct connection is established between the image processing apparatus 10 and the mobile terminal 20A.

If it is determined in step S304 that no other mobile terminal 20 is connected to the image processing apparatus 10 (NO in step S304), the wireless communication control unit 16 shares with the mobile terminal 20A setting information used to establish a Wi-Fi Direct connection (step S306). Processing similar to that of step S104 of FIG. 7A is performed in this step, and the use of the channel for the job data reception process (channel 1) is decided. Consequently, a Wi-Fi Direct connection is established between the image processing apparatus 10 and the mobile terminal 20A.

After a Wi-Fi Direct connection has been established in step S305, the job information management unit 17 receives a scan data transmission request from the mobile terminal 20A via the wireless communication control unit 16 by using channel 6 (step S307). With this scan data transmission request, the scan data ID selected by the user by using the mobile terminal 20A is also transmitted from the mobile terminal 20A. The process then proceeds to step S309. After a Wi-Fi Direct connection has been established in step S306, the job information management unit 17 receives a scan data transmission request from the mobile terminal 20A by using channel 1 (step S308). The process proceeds to step S315 (described later) after step S308.

After step S307, the job information management unit 17 registers and stores content of the scan data transmission request received from the mobile terminal 20A in the job information management table (step S309). As in step S107 of FIG. 7A, the job information management unit 17 registers, for each scan data transmission request, information indicating the MAC address and the device name of the mobile terminal 20A that has transmitted the scan data transmission request and indicating the PMK and the passphrase as the information indicating that there has been a scan data transmission request. The job ID of a print job is registered in the job information management table illustrated in FIG. 6; however, the scan data ID that has been selected by the user and is associated with the scan data transmission request is registered in the job information management table according to the present exemplary embodiment. Processing of steps S307 and S309 corresponds to the queueing process.

The wireless communication control unit 16 then temporarily disconnects the Wi-Fi Direct connection to the mobile terminal 20A (step S310). At this time, the wireless communication control unit 16 notifies the mobile terminal 20A of disconnection of the Wi-Fi Direct connection. In addition, the panel control unit 13 displays a message indicating that the Wi-Fi Direct connection to the mobile terminal 20A has been disconnected on the display unit 11 (step S311).

The wireless communication control unit 16 then determines whether scan data is being transmitted (step S312). In the case where scan data is being transmitted in response to a request from, for example, the mobile terminal 20 different from the mobile terminal 20A, it is determined that scan data is being transmitted. If scan data is being transmitted (YES in step S312), the wireless communication control unit 16 stands by until transmission of the scan data ends. If scan data is not being transmitted (NO in step S312), the wireless communication control unit 16 determines that a condition under which a process for transmitting the scan data requested by the mobile terminal 20A is performed is satisfied and transmits a Wi-Fi Direct connection request to the mobile terminal 20A with reference to the job information management table (step S313). If the scan in step S301 is still being performed, the wireless communication control unit 16 transmits a Wi-Fi Direct connection request after the scan is finished. Accordingly, in the present exemplary embodiment, the scan data transmission process is performed under the conditions that the scanner control unit 15 has finished the scan and that all the preceding processes have been finished (that is, all the scan data transmission processes which the image processing apparatus 10 is requested to perform through connection requests that precede the connection request of the mobile terminal 20 have been finished).

After receiving a response indicating acceptance of the Wi-Fi Direct connection request from the mobile terminal 20A, the wireless communication control unit 16 shares with the mobile terminal 20A setting information used to establish a Wi-Fi Direct connection (step S314). Processing similar to that of step S112 of FIG. 7A is performed in step S314, and the use of the channel for the job data reception process (channel 1) is decided. Consequently, a Wi-Fi Direct connection is established between the image processing apparatus 10 and the mobile terminal 20A.

After a Wi-Fi Direct connection has been established in step S314 or after the job information management unit 17 has received a scan data transmission request from the mobile terminal 20A in step S308, the job information management unit 17 transmits the scan data to the mobile terminal 20A by using channel 1 (step S315). In the case where a Wi-Fi Direct connection has been established in step S314, the job information management unit 17 transmits scan data corresponding to the scan data ID stored in the job information management table in step S309 (i.e., scan data assigned the scan data ID contained in the scan data transmission request that has been received in step S307). In the case where the scan data transmission request has been received from the mobile terminal 20A in step S308, the job information management unit 17 transmits scan data assigned the scan data ID contained in the scan data transmission request that has been received in step S308. Processing of step S315 corresponds to the job data reception process.

Then, the wireless communication control unit 16 disconnects the Wi-Fi Direct connection to the mobile terminal 20A (step S316). At this time, the wireless communication control unit 16 notifies the mobile terminal 20A of disconnection of the Wi-Fi Direct connection. Then, the panel control unit 13 displays a message indicating that the Wi-Fi Direct connection to the mobile terminal 20A has been disconnected on the display unit 11 (step S317). The process then ends.

As described above, the image processing apparatus 10 performs a scan and establishes a connection after accepting a connection request from the mobile terminal 20. The image processing apparatus 10 then registers content of a scan data transmission request and temporarily disconnects the connection to the mobile terminal 20. The image processing apparatus 10 then transmits a connection request to the mobile terminal 20 by using the content of the scan data transmission request and transmits the scan data. In addition, if no other mobile terminal 20 is connected to the image processing apparatus 10 when a connection request from the mobile terminal 20 is accepted, the image processing apparatus 10 transmits the scan data without disconnecting the connection.

In the example illustrated in FIGS. 9A and 9B, the process proceeds to step S305 if it is determined in step S304 that another mobile terminal 20 is connected to the image processing apparatus 10 (YES in step S304); however, even in the case where another mobile terminal 20 is connected to the image processing apparatus 10, the process may proceed to step S306 if transmission of scan data requested by the mobile terminal 20 has been finished. Further, even in the case where it is determined in step S304 that no other mobile terminal 20 is connected to the image processing apparatus 10 (NO in step S304), the process proceeds to step S305 if a process is already stored in the job information management table at that time because the process is performed first.

Further, the wireless communication control unit 16 transmits a connection request to the mobile terminal 20A if scan data is not being transmitted in step S312; however, if another mobile terminal 20 (e.g., the mobile terminal 20B) has transmitted a scan data transmission request before the mobile terminal 20A transmits a scan data transmission request, the wireless communication control unit 16 transmits a connection request to the mobile terminal 20B.

Procedure of Process by Mobile Terminal 20

A process performed by the mobile terminal 20 will be described next. FIG. 10 is a flowchart illustrating an example of a procedure of a process performed by the mobile terminal 20 to transmit a scan data transmission request and to receive scan data. In the example illustrated in FIG. 10, it is assumed that the mobile terminal 20 has detected the image processing apparatus 10 as a connection destination candidate in the initial state as in FIG. 8.

First, the wireless communication control unit 24 transmits a Wi-Fi Direct connection request to the image processing apparatus 10 (step S401). As in step S201 of FIG. 8, a user selects the image processing apparatus 10 from a list of P2P devices displayed on the display unit 21 of the mobile terminal 20 in this step. The Wi-Fi Direct connection request transmitted in step S401 is accepted in step S303 of FIG. 9A. After receiving a response indicating acceptance of the Wi-Fi Direct connection request from the image processing apparatus 10, the wireless communication control unit 24 shares with the image processing apparatus 10 setting information used to establish a Wi-Fi Direct connection (step S402). As in step S202 of FIG. 8, setting information is shared between the image processing apparatus 10 and the mobile terminal 20 in this step, and consequently a Wi-Fi Direct connection is established between the image processing apparatus 10 and the mobile terminal 20.

Then, the job control unit 25 transmits a scan data transmission request to the image processing apparatus 10 (step S403). With the scan data transmission request, the image processing apparatus 10 is notified of the scan data ID selected by the user. If the use of channel 6 is decided in step S402, the job control unit 25 transmits a scan data transmission request by using channel 6. The scan data transmission request transmitted by using channel 6 is received in step S307 of FIG. 9A. In contrast, the use of channel 1 is decided in step S402, the job control unit 25 transmits a scan data transmission request by using channel 1. The scan data transmission request transmitted by using channel 1 is received in step S308 of FIG. 9A.

The wireless communication control unit 24 then determines whether a notification indicating disconnection of the Wi-Fi Direct connection has been received (S404). In the case where a notification indicating disconnection of Wi-Fi Direct connection has been transmitted in step S310 of FIG. 9A, the wireless communication control unit 24 determines that a notification indicating disconnection has been received. If a notification indicating disconnection has been received (YES in step S404), the wireless communication control unit 24 performs a process for temporarily disconnecting the Wi-Fi Direct connection (step S405). Thereafter, in response to a Wi-Fi Direct connection request transmitted in step S313 of FIG. 9B, the wireless communication control unit 24 accepts the Wi-Fi Direct connection request (step S406). The wireless communication control unit 24 also transmits a response indicating acceptance of the Wi-Fi Direct connection request to the image processing apparatus 10.

The wireless communication control unit 24 then shares with the image processing apparatus 10 setting information used to establish a Wi-Fi Direct connection (step S407). As in step S207 of FIG. 8, setting information is shared between the image processing apparatus 10 and the mobile terminal 20 in this step, and consequently a Wi-Fi Direct connection is established between the image processing apparatus 10 and the mobile terminal 20. In addition, the use of the channel for the job data reception process (channel 1) is decided.

After a Wi-Fi Direct connection has been established in step S407 or if no notification indicating disconnection has been received in step S404 (NO in step S404), the job control unit 25 receives scan data by using channel 1 (step S408) as a result of transmission of the scan data in step S315 of FIG. 9B. In response to a notification indicating disconnection of the Wi-Fi Direct connection transmitted in step S316 of FIG. 9B, the wireless communication control unit 24 performs a process for disconnecting the Wi-Fi Direct connection (step S409). The process then ends.

As described above, the mobile terminal 20 transmits a connection request to the image processing apparatus 10, establishes a connection to the image processing apparatus 10, and transmits a scan data transmission request to the image processing apparatus 10. Then, after accepting a connection request from the image processing apparatus 10 and establishing a connection to the image processing apparatus 10, the mobile terminal 20 receives scan data from the image processing apparatus 10.

As described above, in the second exemplary embodiment, the image processing apparatus 10 performs a scan, establishes a connection after accepting a connection request from the mobile terminal 20, registers content of a scan data transmission request, and temporarily disconnects the connection to the mobile terminal 20. Then, the image processing apparatus 10 transmits a connection request to the mobile terminal 20 by using the content of the scan data transmission request and transmits scan data.

A printing process is performed in the first exemplary embodiment, and transmission of scan data is performed in the second exemplary embodiment; however, for example, in the case where one user performs printing at the same time as another user performs a scan, the processes of the first and second exemplary embodiments may be performed in parallel. In this case, the job information management table stored in the job information storage unit 18 is created separately for the printing process and transmission of scan data.

Accordingly, it may be determined that no preceding process is present even if another mobile terminal 20 is connected to the image processing apparatus 10 so as to receive scan data, although it is determined that no preceding process is present if no other mobile terminal 20 is connected to the image processing apparatus 10 when a connection request is received from the mobile terminal 20 in the first exemplary embodiment. Similarly, it may be determined that no preceding process is present even if another mobile terminal 20 is connected to the image processing apparatus 10 for a print job processing request when a connection request is received from the mobile terminal 20 in the second exemplary embodiment.

While the present invention has been described through exemplary embodiments thereof, the technical scope of the present invention is not limited to these exemplary embodiments. It is obvious to those skilled in the art that various modifications and alterations may occur without departing from the spirit and scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first processor configured to:
perform first communication to communicate with a terminal apparatus;
accept a request for a data processing process from the terminal apparatus via the first communication;
store information concerning the requested data processing process in a memory upon the processor accepting the request, temporarily disconnect a connection between the information processing apparatus and the terminal apparatus in response to the request for the data processing, and perform second communication to communicate with the terminal apparatus in a case where a condition under which the requested data processing process to be performed is satisfied; and
perform the requested data processing process via the second communication by using the information stored in the memory,
wherein in a case where a data processing process that has been requested by another terminal apparatus and that has not been finished is not found when the connection is established between the information processing apparatus and the terminal apparatus by the processor, the processor is configured to maintain the connection, instead of temporarily disconnecting the connection after the processor has accepted the request.

2. The information processing apparatus according to claim 1, wherein the request for the data processing process is a request for processing a print instruction for printing a document,
the information concerning the data processing process is information concerning the print instruction requested to be processed in the memory, and
the processor is further configured to receive the print instruction from the terminal apparatus by using the information concerning the print instruction stored in the memory and perform a printing process for the print instruction that has been received.

3. The information processing apparatus according to claim 1, wherein the processor is further configured to:
scan an image on a recording medium and generate image data representing the image that has been scanned,
accept, as the request for the data processing process, a request for transmitting the image data generated by the processor,
store, as the information concerning the data processing process, information concerning the image data requested to be transmitted in the memory, and
transmit the image data to the terminal apparatus by using the information concerning the image data stored in the memory.

4. The information processing apparatus according to claim 1, wherein the processor is further configured to:
perform, as the first communication, wireless communication by using a first frequency band via a connection between the information processing apparatus and the terminal apparatus, and
perform, as the second communication, wireless communication by using a second frequency band different from the first frequency band via a connection between the information processing apparatus and the terminal apparatus.

5. The information processing apparatus according to claim 1, wherein the first communication and the second communication are different communication channels.

6. The information processing apparatus according to claim 1, wherein, if a second terminal apparatus is connected to the information processing apparatus when the request for the data processing process is received, the first communication is disconnected.

7. The information processing apparatus according to claim 6, wherein, after a printing process is performed, the first communication is performed again, and
in response to receiving the request for the data processing, a second printing process is performed.

8. The information processing apparatus according to claim 5, wherein the condition includes that all data processing requested prior to the data processing process requested by the terminal apparatus is finished prior to the data processing process requested by the terminal apparatus being performed.

9. A terminal apparatus comprising:
a processor configured to:
perform third communication to communicate with an information processing apparatus which performs a data processing process;
transmit a request for a data processing process to the information processing apparatus via the third communication;
perform fourth communication to communicate with the information processing apparatus, upon accepting a connection request from the information processing apparatus after a connection between the terminal apparatus and the information processing apparatus has been temporarily disconnected upon the processor transmitting the request for the data processing process; and
perform a process for transmitting data used in the data processing process to the information processing apparatus via the fourth communication or a process for receiving data transmitted from the information processing apparatus in the data processing process via the fourth communication,
wherein in a case where a data processing process that has been requested by another terminal apparatus and that has not been finished is not found when the connection is established between the information processing apparatus and the terminal apparatus by the processor, the processor is configured to maintain the connection, instead of temporarily disconnecting the connection after the processor has accepted the request.

10. A method of controlling an information processing apparatus, the method comprising:
performing first communication to communicate with a terminal apparatus;
accepting a request for a data processing process from the terminal apparatus via the first communication;
storing information concerning the requested data processing process in a memory upon acceptance of the request, temporarily disconnecting a connection between an information processing apparatus and the terminal apparatus in response to the request for the data processing, and performing second communication to communicate with the terminal apparatus in a case where a condition under which the requested data processing process is performed is satisfied; and
performing the requested data processing process via the second communication by using the information stored in the memory,
wherein in a case where a data processing process that has been requested by another terminal apparatus and that has not been finished is not found when the connection is established between the information processing apparatus and the terminal apparatus by the processor, the processor is configured to maintain the connection, instead of temporarily disconnecting the connection after the processor has accepted the request.

11. A non-transitory computer readable medium storing a program causing a computer to execute a process for information processing, the process comprising:
performing third communication to communicate with an information processing apparatus which performs a data processing process;
transmitting a request for a data processing process to the information processing apparatus via the third communication;
performing fourth communication to communicate with the information processing apparatus, upon acceptance of a connection request from the information processing apparatus after a connection between the computer and the information processing apparatus has been temporarily disconnected upon transmission of the request for the data processing process; and
performing a process for transmitting data used in the data processing process to the information processing apparatus via the fourth communication or a process for receiving data transmitted from the information processing apparatus in the data processing process via the fourth communication,
wherein in a case where a data processing process that has been requested by another terminal apparatus and that has not been finished is not found when the connection is established between the information processing apparatus and the terminal apparatus by the processor, the processor is configured to maintain the connection, instead of temporarily disconnecting the connection after the processor has accepted the request.

12. An information processing system comprising:
an information processing apparatus configured to perform a data processing process; and
a terminal apparatus configured to transmit a request for a data processing process to the information processing apparatus,
the information processing apparatus including a processor configured to:
perform first communication to communicate with the terminal apparatus,
accept the request for a data processing process from the terminal apparatus via the first communication,
store information concerning the requested data processing process in a memory upon the processor accepting the request, temporarily disconnect a connection between the information processing apparatus and the terminal apparatus in response to the request for the data processing, and perform second communication to communicate with the terminal apparatus in a case where a condition under which the requested data processing process is performed is satisfied, and
perform the requested data processing process via the second communication by using the information stored in the memory,
wherein in a case where a data processing process that has been requested by another terminal apparatus and that has not been finished is not found when the connection is established between the information processing apparatus and the terminal apparatus by the processor, the processor is configured to maintain the connection, instead of temporarily disconnecting the connection after the processor has accepted the request.

* * * * *